(12) United States Patent
Chodavarapu

(10) Patent No.: US 9,774,230 B2
(45) Date of Patent: Sep. 26, 2017

(54) GENERATOR SET HAVING COUPLING MEMBER BETWEEN FLYWHEEL AND GENERATOR

(71) Applicant: Caterpillar Inc., Peoria, IL (US)

(72) Inventor: Prasad Chodavarapu, West Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 51 days.

(21) Appl. No.: 14/951,574

(22) Filed: Nov. 25, 2015

(65) Prior Publication Data

US 2017/0149305 A1    May 25, 2017

(51) Int. Cl.
| | |
|---|---|
| *F02B 63/04* | (2006.01) |
| *H02K 7/18* | (2006.01) |
| *H02K 7/02* | (2006.01) |
| *H02K 7/00* | (2006.01) |
| *F16D 3/00* | (2006.01) |

(52) U.S. Cl.
CPC .......... *H02K 7/1815* (2013.01); *H02K 7/003* (2013.01); *H02K 7/02* (2013.01); *H02K 7/025* (2013.01)

(58) Field of Classification Search
USPC ............................................ 290/1 A; 464/96
See application file for complete search history.

(56) References Cited

U.S. PATENT DOCUMENTS

| | | | | |
|---|---|---|---|---|
| 4,664,642 A | * | 5/1987 | Kirschey .................. | F16D 3/74 464/85 |
| 4,912,995 A | * | 4/1990 | Otters ..................... | F02G 1/043 290/1 C |
| 4,929,115 A | * | 5/1990 | Lunke ...................... | F16D 3/74 403/220 |
| 5,066,263 A | * | 11/1991 | Lunke ...................... | F16D 3/74 464/96 |
| 5,617,940 A | * | 4/1997 | Fukushima ....... | F16F 15/13107 192/208 |
| 5,695,035 A | * | 12/1997 | Fukushima ....... | F16F 15/13107 192/208 |
| 5,816,102 A | * | 10/1998 | Kern ...................... | F02B 63/04 290/1 A |

(Continued)

FOREIGN PATENT DOCUMENTS

| | | |
|---|---|---|
| CN | 201599092 | 10/2010 |
| CN | 203356663 | 12/2013 |

(Continued)

*Primary Examiner* — Pedro J Cuevas

(57) ABSTRACT

A generator set is disclosed. The generator set includes an engine and a flywheel coupled to the engine. The generator set further includes a generator having a housing and a hub portion configured to receive power from the engine. The generator set further includes a coupling member coupled to the flywheel and the hub portion within the housing of the generator. The coupling member includes an outer ring member disposed adjacent to the flywheel. The coupling member further includes an inner ring member disposed within the outer ring member. The coupling member further includes a plurality of blocks disposed within each of plurality of slots. The coupling member is disposed at an axial distance from an inner face of the housing. The housing of the generator includes one or more access openings to access the coupling member from outside the housing.

20 Claims, 4 Drawing Sheets

(56) References Cited

U.S. PATENT DOCUMENTS

| | | | | |
|---|---|---|---|---|
| 5,997,402 A * | 12/1999 | Fukushima | | F16F 15/13107 192/208 |
| 6,149,525 A * | 11/2000 | Fukushima | | F16F 15/13107 464/24 |
| 6,264,564 B1 * | 7/2001 | Fukushima | | F16F 15/13107 464/68.3 |
| 6,608,393 B2 | 8/2003 | Anderson | | |
| 6,953,399 B2 * | 10/2005 | Kirschey | | F16D 3/74 464/87 |
| 7,293,543 B1 | 11/2007 | Scekic | | |
| 7,335,107 B2 * | 2/2008 | Brosowske | | F16D 3/80 464/27 |
| 7,675,187 B2 * | 3/2010 | Woods | | F01P 3/00 290/1 A |
| 7,969,030 B2 * | 6/2011 | Woods | | F01P 3/00 290/1 A |
| 8,033,919 B2 * | 10/2011 | Baikie | | F16D 3/74 464/903 |
| 8,222,756 B2 * | 7/2012 | Koeneman | | F01P 3/00 290/1 A |
| 8,492,913 B2 * | 7/2013 | Koeneman | | F01P 3/00 290/1 A |
| 8,829,698 B2 * | 9/2014 | Koeneman | | F01P 3/00 290/1 A |
| 8,925,660 B2 | 1/2015 | Bowdich et al. | | |
| 2004/0058735 A1 * | 3/2004 | Kirschey | | F16D 3/74 464/92 |
| 2004/0204286 A1 * | 10/2004 | Stridsberg | | B60K 6/405 477/14 |
| 2007/0145745 A1 * | 6/2007 | Woods | | F01P 3/00 290/1 A |
| 2007/0227470 A1 * | 10/2007 | Cole | | H02K 1/2786 123/3 |
| 2014/0375064 A1 * | 12/2014 | Koeneman | | F01P 3/00 290/1 A |

FOREIGN PATENT DOCUMENTS

| | | |
|---|---|---|
| CN | 203441597 | 2/2014 |
| GB | 630824 | 10/1949 |
| JP | 2013224585 | 10/2013 |

* cited by examiner

# GENERATOR SET HAVING COUPLING MEMBER BETWEEN FLYWHEEL AND GENERATOR

TECHNICAL FIELD

The present disclosure relates to a generator set, and more particularly relates to a coupling member disposed between a flywheel of an engine and a generator of the generator set.

BACKGROUND

Generally, a generator set supplies electric power in locations where power from a utility provider is not readily available or when backup electric power is required. The generator set includes an engine having a flywheel and a generator coupled to the flywheel via a coupling member. In such generator set, there may not be enough space to replace or service rubber blocks of the coupling member. As such, the generator has to be moved in order to replace or service the rubber blocks of the coupling member. This may cause difficulty in maintenance and service of the coupling member. Further, labor cost and cost of maintenance may increase.

GB Patent Number 630,824 (the '824 patent) discloses flexible couplings with substantially radial rigid drive-transmitting links having rubber bushed end connections to axial pegs or sleeves. The links may serve to connect driving and driven members directly together, or each to a floating intermediate member. To couple a marine engine to reduction gearing or a propeller, rubber bushes are bonded directly between the pins of three welded-up links and the interior of forged housings. The forged housing is bolted to a driving flywheel and to the cut-away flange of the input coupling sleeve of a gearbox. Alternatively, the bushes may be bonded between outer sleeves secured to the links and inner sleeves secured to pegs on the flywheel and flange.

SUMMARY OF THE DISCLOSURE

In one aspect of the present disclosure, a generator set is provided. The generator set includes an engine and a flywheel coupled to the engine. The generator set further includes a generator having a housing and a hub portion configured to receive power from the engine. The generator set further includes a coupling member coupled to the flywheel and the hub portion within the housing of the generator. The coupling member is disposed at an axial distance from an inner face of the housing. The coupling member includes an outer ring member disposed adjacent to the flywheel, and coupled to the flywheel. The outer ring member has a plurality of first teeth extending from an inner surface thereof. The coupling member further includes an inner ring member disposed within the outer ring member, and coupled to the hub portion. The inner ring member has a plurality of second teeth extending from an outer surface thereof. Each of the plurality of the first teeth and the second teeth define a plurality of slots between the outer ring member and the inner ring member. The coupling member further includes a plurality of blocks disposed within each of the plurality of slots. The coupling member is disposed at an axial distance from an inner face of the housing. The housing comprises one or more access openings to access the coupling member from outside the housing.

In another aspect of the present disclosure, a coupling member disposed between a flywheel of an engine and a generator is provided. The coupling member includes an outer ring member disposed adjacent to the flywheel, and coupled to the flywheel. The outer ring member has a plurality of first teeth extending from an inner surface thereof. The coupling member further includes an inner ring member disposed within the outer ring member, and coupled to the hub portion. The inner ring member has a plurality of second teeth extending from an outer surface thereof. Each of the plurality of first teeth and the second teeth define a plurality of slots between the outer ring member and the inner ring member. The coupling member further includes a plurality of blocks disposed within each of the plurality of slots.

In yet another aspect of the present disclosure, a generator set is provided. The generator set includes an engine and a flywheel coupled to the engine. The generator set further includes a generator having a housing and a hub portion configured to receive power from the engine. The generator set further includes a coupling member coupled to the flywheel and the hub portion within the housing of the generator. The coupling member is disposed at an axial distance from an inner face of the housing. The coupling member includes an outer ring member disposed adjacent to the flywheel, and coupled to the flywheel. The outer ring member has a plurality of first teeth extending from an inner surface thereof. The coupling member further includes an inner ring member disposed within the outer ring member, and coupled to the hub portion. The inner ring member has a plurality of second teeth extending from an outer surface thereof. Each of the plurality of first teeth and the second teeth define a plurality of slots between the outer ring member and the inner ring member. The coupling member further includes a plurality of blocks disposed within each of the plurality of slots.

Other features and aspects of this disclosure will be apparent from the following description and the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
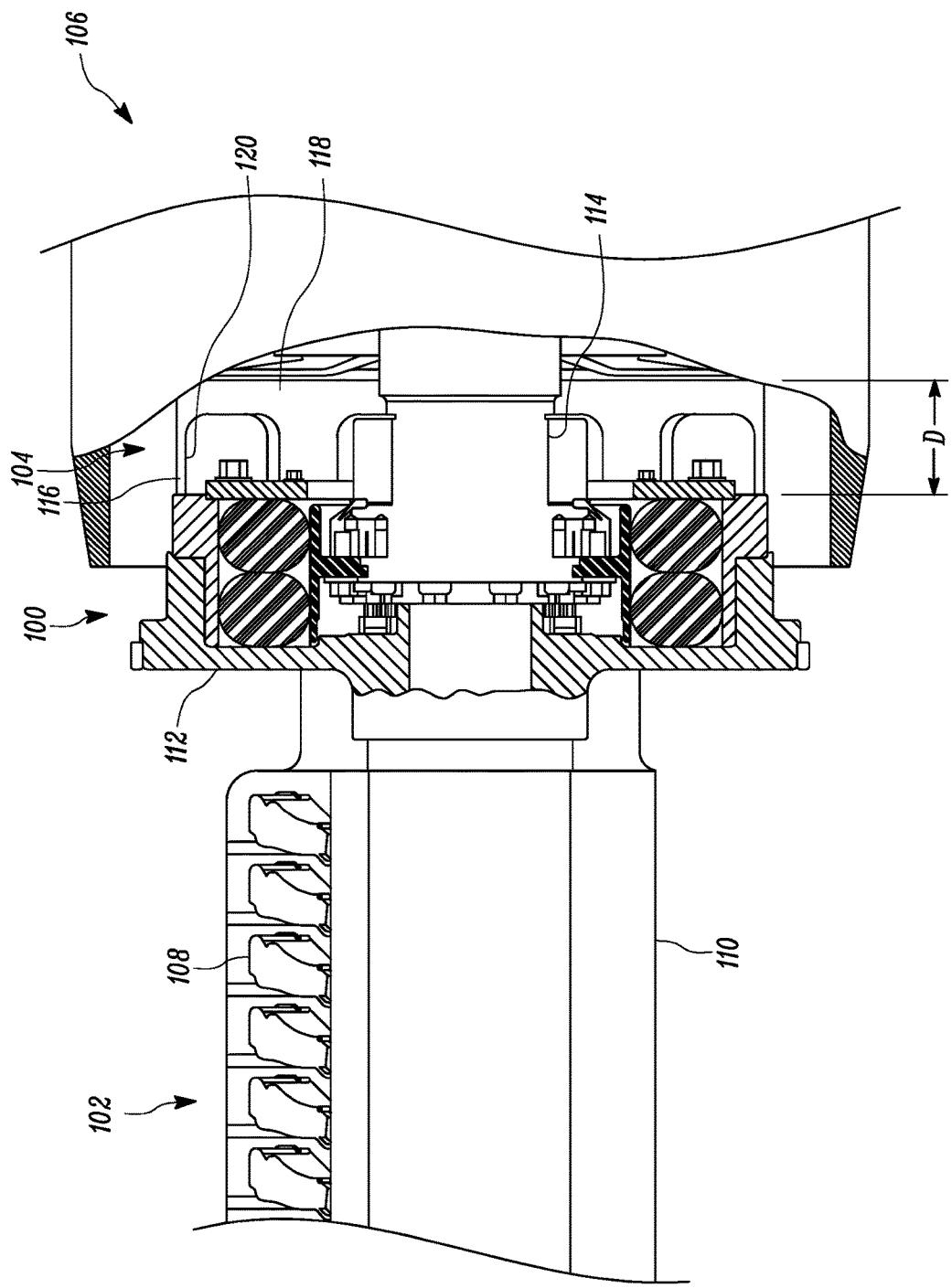
FIG. 1 is a sectional view of a coupling member disposed between an engine and a generator of a generator set, according to an embodiment of the present disclosure.

FIG. 1 illustrates a sectional view of a coupling member 100 disposed between an engine 102 and a generator 104 of a generator set 106, according to an embodiment of the present disclosure. The generator set 106 may be configured to supply electric power in locations where utility power is not available or when backup electric power is required. The generator set 106 includes the engine 102. The engine 102 may be run by a gaseous fuel, such as LPG, CNG, hydrogen, and the like. Further, the engine 102 may use the gaseous fuel as a primary fuel during operation and may use gasoline or diesel as a secondary fuel during starting of the engine 102. In an example, the engine 102 may run on a single fuel, such as gasoline, and diesel.

The engine 102 includes a cylinder head 108 mounted on a cylinder block 110. The cylinder head 108 may define one or more inlet ports and one or more outlet ports for each of the cylinders. The cylinder block 110 is configured to define a plurality of cylinders (not shown) therein. The plurality of cylinders may be arranged in various configurations, such as a rotary configuration, a V-type configuration or any other configurations known in the art. However, it may be contemplated that the engine 102 may include a single cylinder. A piston may be slidably disposed within the cylinder for reciprocating, upon combustion of the fuel, during operation of the engine 102. The piston may be further coupled to a crankshaft (not shown) via a connecting rod, which transmits the reciprocating motion of the piston into a rotary motion at the crankshaft. The crankshaft may be rotatably coupled to the cylinder block 110 of the engine 102. The cylinder block 110 may be supported on a base plate (not shown) of the generator 104 set via multiple supporting members and fasteners.

The generator set 106 includes a flywheel 112 coupled to the crankshaft of the engine 102. The flywheel 112 may be used for energy storage purposes. The flywheel 112 may be configured to convert a rotational power generated by the engine 102 into an electric power. The generator set 106 further includes the generator 104 having a hub portion 114 and a housing 116. The generator 104 is configured to receive the rotational power from the engine 102.

In an example, the generator 104 may be used for supplying power to an electric drive of an off road machine or an on road machine. The generator 104 may be an AC generator, a DC generator or any other type of electric generators known in the art. In various embodiments, any power devices, such as a transmission system, and a hydraulic pump may be used for converting the rotational power received from the engine 102 into a mechanical power, a hydraulic power, and/or a combination thereof. The generator set 106 further includes the coupling member 100 coupled to the flywheel 112 and the hub portion 114 within the housing 116 of the generator 104. The coupling member 100 is disposed at an axial distance 'D' from an inner face 118 of the housing 116. The housing 116 may enclose various components of the generator 104. Further, the housing 116 includes a plurality of access openings 120 defined adjacent to the coupling member 100. The plurality of access openings 120 is configured to access the coupling member 100 from outside the housing 116. In the illustrated embodiment, each of the plurality of access openings 120 has a rectangular shape. Further, each of the plurality of openings 120 has a length and a width defined in such a way that an operator may insert a tool and/or hand therethrough to access the coupling member 100. In other embodiments, each of the plurality of access openings 120 may have a circular shape, a square shape, a polygonal shape, an elliptical shape or any other shape known in the art. It may be understood that the housing 116 may include one opening for accessing the coupling member 100 from outside the housing 116.

Figure 2:
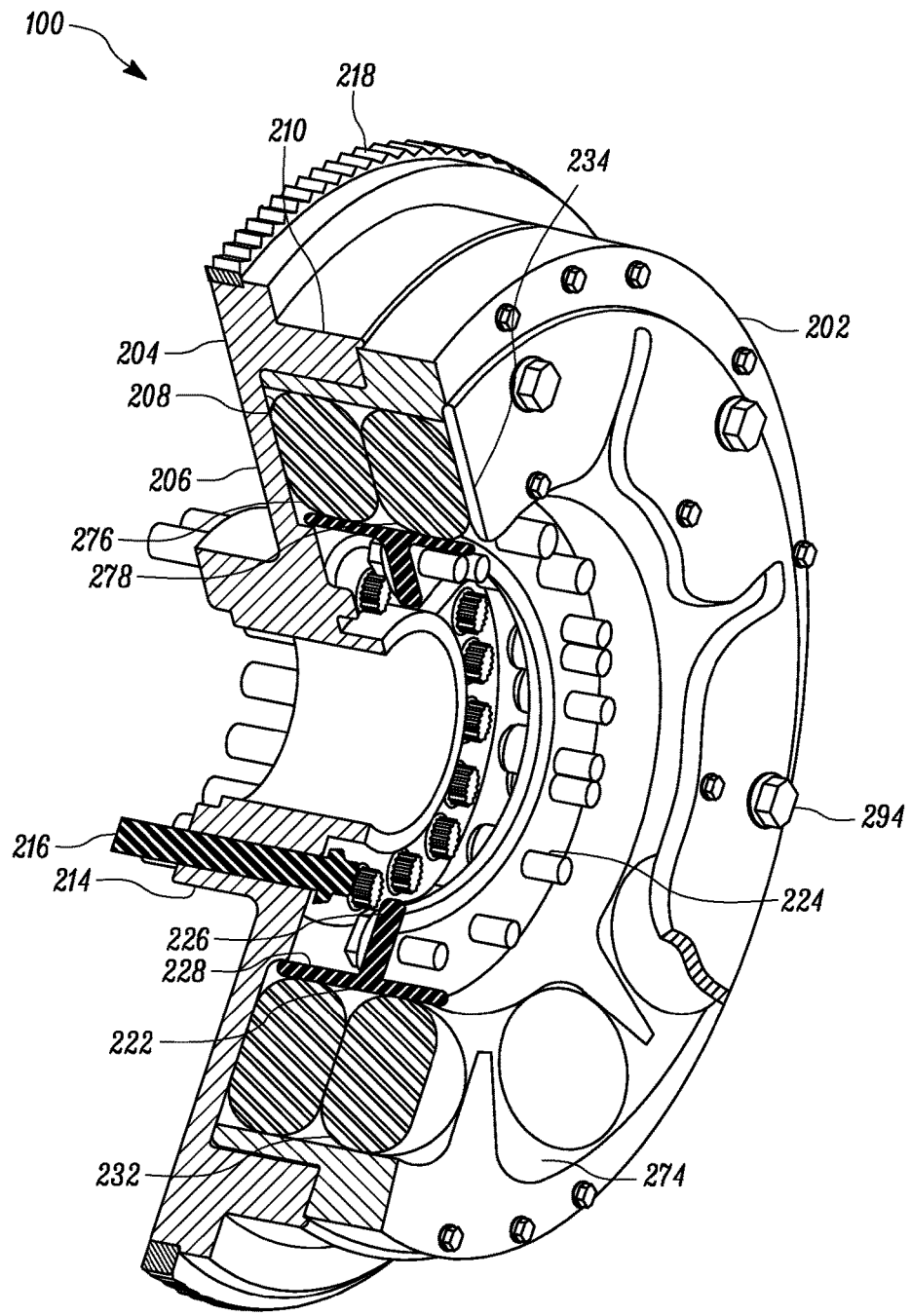
FIG. 2 is a perspective view of a cut section of the coupling member coupled to a flywheel of the engine, according to an embodiment of the present disclosure.
Figure 4:
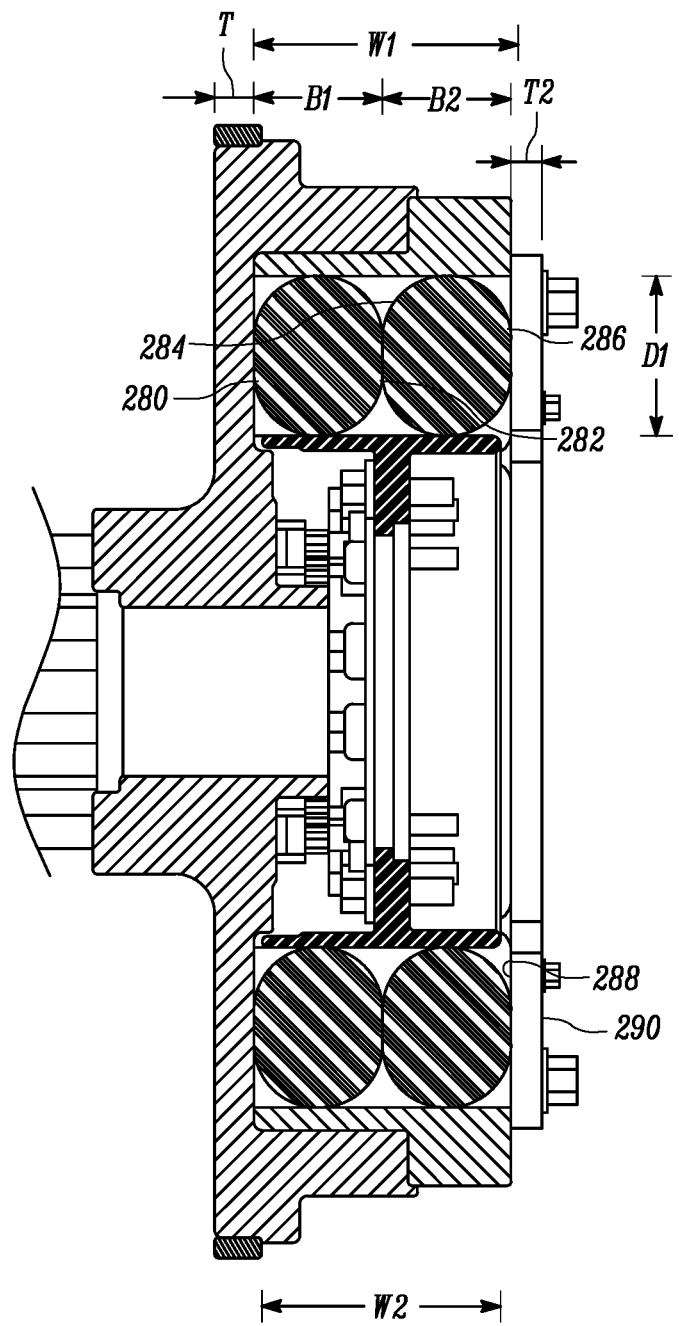
FIG. 4 is a sectional view of the coupling member of FIG. 1, according to an embodiment of the present disclosure.

FIG. 2 illustrates a perspective view of a cut section of the coupling member 100 coupled to the flywheel 112 of the engine 102, according to an embodiment of the present disclosure. The coupling member 100 includes an outer ring member 202 disposed adjacent to the flywheel 112 and coupled to the flywheel 112. The flywheel 112 includes an annular body 204 having a thickness 'T' (as shown in FIG. 4) defined between a first surface 206 and a second surface 208. The flywheel 112 further includes an annular flange 210 extending from the second surface 208. The annular flange 210 is configured to engage with the outer ring member 202 of the coupling member 100. In an exemplary embodiment, the annular flange 210 may be an individual component that may be separately coupled to the annular body 204 via a plurality of fastening members, such as bolts and nuts. The annular body 204 of the flywheel 112 includes a central hub portion 214. The central hub portion 214 is coupled to the crankshaft of the engine 102 via a plurality of first fastening members 216, such as bolts and nuts. An annular gear ring 218 having a plurality of teeth is provided at an outer edge of the annular body 204. The annular gear ring 218 may be engaged with a drive gear of a starter motor. The starter motor may be used for cranking the engine 102 by rotating the flywheel 112.

The coupling member 100 further includes an inner ring member 222 disposed within the outer ring member 202 and coupled to the hub portion 114 of the generator 104 via a plurality of second fastening members 224. In the illustrated embodiment, the inner ring member 222 includes a flange 226 extending from an inner surface 228 thereof. The flange 226 is coupled to the hub portion 114 of the generator 104 using the plurality of second fastening members 224. In various embodiments, the inner ring member 222 may be coupled to the hub portion 114 of the generator 104 by any other coupling method known in the art.

The coupling member 100 further includes a plurality of blocks 232 disposed between the outer ring member 202 and the inner ring member 222. An arrangement of the plurality of blocks 232 between the outer ring member 202 and the inner ring member 222 will be described in detail in FIG. 3. The coupling member 100 further includes a face plate 234 coupled to the outer ring member 202. The face plate 234 is configured to restrict movement of the plurality of blocks 232 within the outer ring member 202 and the inner ring member 222.

Figure 3:
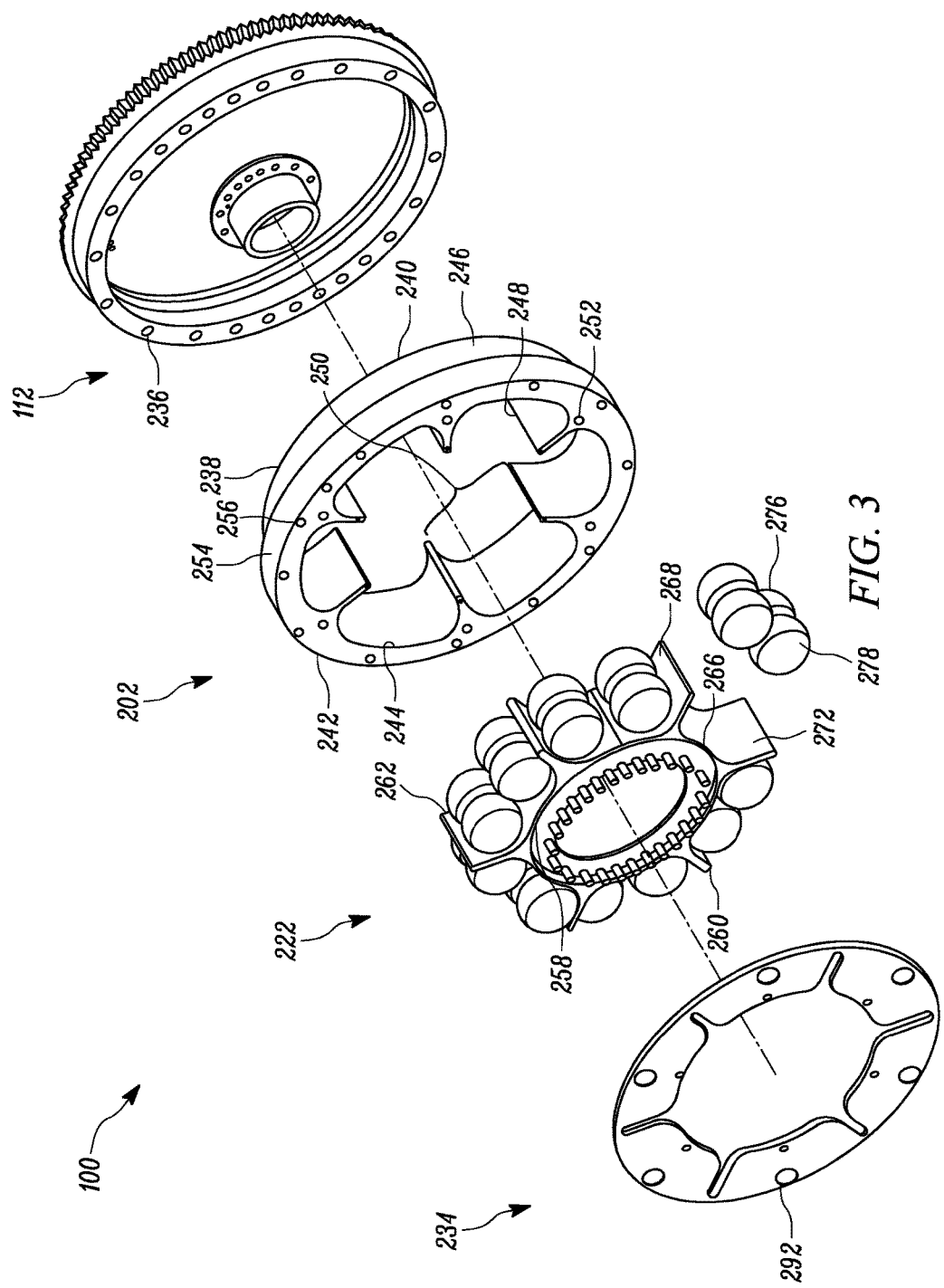
FIG. 3 is an exploded view of the coupling member, according to an embodiment of the present disclosure.

FIG. 3 illustrates an exploded view of the coupling member 100, according to an embodiment of the present disclosure. Referring to FIGS. 2 and 3, the annular flange 210 of the flywheel 112 includes a plurality of first holes 236 to receive the plurality of fastening members. The outer ring member 202 includes an annular ring body 238 having a width 'W1' defined between a first end 240 and a second end 242. The first end 240 of the annular ring body 238 is in contact with the inner surface of the annular body 204 of the flywheel 112. Also, the face plate 234 is coupled to the second end 242 of the annular ring body 238. The annular ring body 238 is hereinafter referred to as 'the first annular ring body 238'. The first annular ring body 238 further includes an inner surface 244 and an outer surface 246. The inner surface 244 and the outer surface 246 extend between the first end 240 and the second end 242 of the first annular ring body 238. The outer ring member 202 further includes a plurality of first teeth 248 extending from the inner surface 244 of the outer ring member 202. In the illustrated embodiment, two adjacent teeth members define a first slot. As such, a plurality of the first slots 250 is defined by the plurality of the first teeth 248. A plurality of second holes 252 is defined in the first annular ring body 238 adjacent to a base of the plurality of first teeth 248 to receive a plurality of fastening members. The outer ring member 202 further includes an annular projection 254 extending from the outer surface 246 of the first annular ring body 238. The annular projection 254 hereinafter referred to as 'the first annular projection 254'. The first annular projection 254 includes a plurality of third holes 256 configured to receive a plurality of fastening members. The fastening members further couple the first annular projection 254 of the outer ring member 202 with the annular flange 210 of the flywheel 112. During assembly of the outer ring member 202 with the flywheel 112, the plurality of first holes 236 may be aligned with a plurality of third holes 256 such that the plurality of fastening members may be received therethrough to couple the outer ring member 202 with the flywheel 112.

In an exemplary embodiment, the first annular projection 254 may be an individual component that may be separately coupled to the first annular ring body 238. The inner ring member 222 includes a second annular ring body 258 having a width 'W2' defined between a first end 260 and a second end 262. The first end 260 is adjacent to the face plate 234 and the second end 262 is adjacent to the annular body 204 of the flywheel 112. The width 'W2' of the second annular ring body 258 is less than or equal to the width 'W1' of the first annular ring body 238. The second annular ring body 258 further includes an inner surface and an outer surface 266. The inner surface and the outer surface 266 extend between the first end 260 and the second end 262 of the second annular ring body 258. The flange 226 of the inner ring member 222 extends from the inner surface of the second annular ring body 258. The flange 226 is coupled to the hub portion 114 of the generator 104 via the plurality of second fastening members 224. The inner ring member 222 further includes a plurality of second teeth 268. The plurality of second teeth 268 extend from an outer surface of the inner ring member 222. In the illustrated embodiment, two adjacent teeth members define a second slot 272. As such, a plurality of the second slots 272 is defined by the plurality of the second teeth 268. In an assembled condition of the coupling member 100, each of the plurality of first teeth 248 and each of the plurality of second teeth 268 are configured to define a plurality of slots 274 between the outer ring member 202 and the inner ring member 222. Specifically, the plurality of first slots 250 defined by the plurality of first teeth 248 and the plurality of second slots 272 defined by the plurality of second teeth 268 overlap each other to define the plurality of slots 274. In an example, a first tooth 248 and a second tooth 268 are configured to define one slot 274.

The coupling member 100 includes the plurality of blocks 232 disposed within each of the plurality of slots 274. In the illustrated embodiment, the plurality of blocks 232 includes multiple pairs of the blocks. Each pair of the multiple pairs of blocks is disposed in each of the plurality of slots 274. Further, each pair of the blocks includes a first block 276 and a second block 278. The first block 276 has a first width 'B1' extending between a first surface 280 and a second surface 282. The first surface 280 of the first block 276 is in contact with the second surface 208 of the annular body 204 of the flywheel 112. Similarly, the second block 278 has a second width 'B2' extending between a first surface 284 and a second surface 286. In the illustrated embodiment, the first width 'B1' of the first block 276 is equal to the second width 'B2' of the second block 278. Further, each of the first block 276 and the second block 278 has a circular cross section defining a diameter 'D1'. The diameter 'D1' of each of the first block 276 and the second block 278 may be smaller than the length and/or the width of the opening defined in the housing 116 of the generator 104. Further, the first width 'B1' and the second width 'B2' of the first block 276 and the second block 278, are smaller than the length and/or the width of the access opening 120 defined in the housing 116 of the generator 104. In another embodiment, the first width 'B1' of the first block 276 may be lesser or greater than the second width 'B2' of the second block 278. Further, the cross section of each of the first block 276 and the second block 278 may have a square shape, an elliptical shape, a polygonal shape or any other shape known in the art. However, it may be understood that a size defined by the cross sectional shape of each of the plurality of the blocks 232 may be smaller than a size defined by each of the access openings 120 provided in the housing 116 of the generator 104. In the assembled condition of the coupling member 100, the first surface 284 of the second block 278 is in contact with the second surface 282 of the first block 276. In an embodiment, the first block 276 and the second block 278 may include, but not limited to, a rubber block. In the illustrated embodiment, the width 'W1' of the first annular ring body 238 of the outer ring member 202 is greater than or equal to a sum of the first width 'B1' of the first block 276 and the second width 'B2' of the second block 278. In another embodiment, the width 'W1' of the first annular ring body 238 of the outer ring member 202 is less than the sum of the first width 'B1' of the first block 276 and the second width 'B2' of the second block 278.

The coupling member 100 further includes the face plate 234 coupled to the outer ring member 202. The face plate 234 restricts axial movement of the first block 276 and the second block 278 within each of the plurality of slots 274. Further, the face plate 234 includes an inner surface 288 and an outer surface 290. The face plate 234 may include a plurality of fourth holes 292 to couple the face plate 234 with the outer ring member 202 using a plurality of third fastening members 294. During assembly of the coupling member 100, the plurality of first holes 236 of the face plate 234 may be aligned to the plurality of second holes 252 provided on the first annular ring body 238.

FIG. 4 illustrates a sectional view of the coupling member 100 of FIG. 1, according to an embodiment of the present disclosure. The annular body 204 of the flywheel 112 has the thickness 'T' defined between the first surface 206 and the second surface 208. Further, the first annular ring body 238 of the outer ring member 202 has the width 'W1' defined between the first end 240 and the second end 242. In the illustrated embodiment, a ratio of the thickness 'T' of the annular body 204 of the flywheel 112 to the width 'W1' of the first annular ring body 238 of the outer ring member 202 is in a range between 0.1 and 0.3. It may be understood that the ratio may vary based on various parameters including, but not limited to, the first width 'B1' and the second width 'B2' of the first block 276 and the second block 278, the axial distance 'D' between the coupling member 100 and the inner face 118 of the housing 116, and a thickness 'T2' of the face plate 234. Further, the axial distance 'D' between the coupling member 100 and the inner face 118 of the housing 116 is in a range between 75 mm to 125 mm. The axial distance 'D' is greater than first width 'B1' or the second width 'B2' of the first block 276 or the second block 278. In various examples, the thickness 'T' of the annular body 204 of the flywheel 112 may be in a range between 15 mm to 25 mm. Further, the width 'W1' of the outer ring member 202 may be in a range between 55 mm to 65 mm. Further, the thickness 'T2' of the face plate 234 may be in a range between 10 mm to 20 mm.

INDUSTRIAL APPLICABILITY

The present disclosure relates to the coupling member 100 disposed between the flywheel 112 of the engine 102 and the generator 104. The one or more access openings 120 within the housing 116 provide access to the coupling member 100 from outside the housing 116. The outer ring member 202 is modified to provide additional clearance within the generator 104 for accessing the plurality of blocks 232.

The first block 276 and the second block 278 are easily detachable from the generator set 106. Thus, the first block 276 and the second block 278 can be easily replaced after being detached without having to dismantle the generator 104 from the flywheel 112. Further, the coupling member 100 provides a cushioning effect during operation of the generator set 106. In other words, the first block 276 and the second block 278 may dampen vibration by way of absorption generated during operation of the generator set 106, thus enhancing the efficiency during the operation of the generator set 106.

Further, when an operator has to service or replace the first block 276 and the second block 278, the operator can access the plurality of blocks 232 through the plurality of access openings 120. The operator has to unbolt the third fastening members 294 of the face plate 234 to access the first block 276 and the second block 278. Further, as the axial distance 'D' is greater than the first width 'B1' or the second width 'B2' of the first block 276 or the second block 278, respectively, the operator can access the first block 276 and the second block 278. As such, when the first block 276 and the second block 278 are removed through the plurality of access openings 120, the operator can service the first block 276 and the second block 278. Furthermore, the operator can replace the first block 276 and the second block 278 in the coupling member 100. Once the operator has replaced the first block 276 and the second block 278, the operator may now bolt the face plate 234 to the outer ring member 202 through the third fastening members 294.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A generator set comprising:
   an engine;
   a flywheel coupled to the engine;
   a generator having a housing and a hub portion configured to receive a power from the engine; and
   a coupling member coupled to the flywheel and the hub portion within the housing of the generator, the coupling member comprising:
      an outer ring member disposed adjacent to the flywheel, and coupled to the flywheel, the outer ring member having a plurality of first teeth extending from an inner surface thereof;
      an inner ring member disposed within the outer ring member, and coupled to the hub portion, the inner ring member having a plurality of second teeth extending from an outer surface thereof, wherein each of the plurality of first teeth and each of the plurality of second teeth define a plurality of slots between the outer ring member and the inner ring member; and
      a plurality of blocks disposed within each of the plurality of slots,
   wherein the coupling member is disposed at an axial distance from an inner face of the housing, and wherein the housing comprises one or more access openings to access the coupling member from outside the housing.

2. The generator set of claim 1, wherein the flywheel comprises:
   an annular body having a thickness defined between a first surface and a second surface; and
   an annular flange extending from the second surface, and configured to engage with the outer ring member of the coupling member.

3. The generator set of claim 2, wherein the outer ring member comprises:
   an annular ring body having a width defined between a first end and a second end; and
   an annular projection extending from an outer surface of the annular ring body, the annular projection configured to couple to the annular flange of the flywheel using fastening members.

4. The generator set of claim 3, wherein a ratio of the thickness of the annular body of the flywheel to the width of the annular ring body of the outer ring member is in a range between 0.1 and 0.3.

5. The generator set of claim 3, wherein the plurality of blocks comprises:
   a first block having a first width, and configured to abut the second surface of the annular body of the flywheel; and
   a second block having a second width, and configured to abut the first block, and wherein the width of the annular ring body of the outer ring member is greater than or equal to a sum of the first width of the first block and the second width of the second block.

6. The generator set of claim 5 comprising a face plate coupled to the outer ring member, the face plate configured to restrict axial movement of the first block and the second block within each of the plurality of slots.

7. The generator set of claim 5, wherein the one or more access openings are configured to receive the first block and the second block therethrough.

8. The generator set of claim 1, wherein the axial distance is in a range between 75 mm and 125 mm.

9. A coupling member disposed between a flywheel of an engine and a generator, the coupling member comprising:
   an outer ring member disposed adjacent to the flywheel, and coupled to the flywheel, the outer ring member having a plurality of first teeth extending from an inner surface thereof;
   an inner ring member disposed within the outer ring member, and coupled to the generator, the inner ring member having a plurality of second teeth extending from an outer surface thereof, wherein each of the plurality of first teeth and each of the plurality of second teeth define a plurality of slots between the outer ring member and the inner ring member; and
   a plurality of blocks disposed within each of the plurality of slots.

10. The coupling member of claim 9, wherein the outer ring member comprises:
    a first annular ring body having a width defined between a first end and a second end; and
    a first annular projection extending from an outer surface of the first annular ring body, the first annular projection configured to couple to an annular flange of the flywheel using fastening members.

11. The coupling member of claim 10, wherein the inner ring member comprises:

a second annular ring body having a width defined between a first end and a second end, wherein the width of the second annular ring body is less than or equal to the width of the first annular ring body; and a second annular projection extending from an inner surface of the second annular ring body, the second annular projection configured to couple to a hub portion of the generator using fastening members.

12. The coupling member of claim 10, wherein the plurality of blocks comprises:

a first block having a first width, and configured to abut the flywheel; and a second block having a second width, and configured to abut the first block, and wherein the width of the first annular ring body of the outer ring member is greater than or equal to a sum of the first width of the first block and the second width of the second block.

13. The coupling member of claim 12 comprising a face plate coupled to the outer ring member, the face plate configured to restrict axial movement of the first block and the second block within each of the plurality of slots.

14. A generator set comprising:

an engine;

a flywheel coupled to the engine;

a generator having a housing and a hub portion configured to receive power from the engine; and a coupling member coupled to the flywheel and the hub portion within the housing of the generator, the coupling member comprising:

an outer ring member disposed adjacent to the flywheel, and coupled to the flywheel, the outer ring member having a plurality of first teeth extending from an inner surface thereof;

an inner ring member disposed within the outer ring member, and coupled to the hub portion, the inner ring member having a plurality of second teeth extending from an outer surface thereof, wherein each of the plurality of first teeth and each of the plurality of second teeth define a plurality of slots between the outer ring member and the inner ring member; and a plurality of blocks disposed within each of the plurality of slots.

15. The generator set of claim 14, wherein the flywheel comprises:

an annular body having a thickness defined between a first surface and a second surface; and an annular flange extending from the second surface, and configured to engage with the outer ring member of the coupling member.

16. The generator set of claim 15, wherein the outer ring member comprises:

a first annular ring body having a width defined between a first end and a second end; and a first annular projection extending from an outer surface of the first annular ring body, the first annular projection configured to couple to the annular flange of the flywheel using fastening members.

17. The generator set of claim 16, wherein the inner ring member comprises:

a second annular ring body having a width defined between a first end and a second end, wherein the width of the second annular ring body is less than or equal to the width of the first annular ring body; and a second annular projection extending from an inner surface of the second annular ring body, the second annular projection configured to couple to the hub portion of the generator using fastening members.

18. The generator set of claim 16, wherein the plurality of blocks comprises:

a first block having a first width, and configured to abut the second surface of the annular body of the flywheel; and a second block having a second width, and configured to abut the first block, and wherein the width of the first annular ring body of the outer ring member is greater than or equal to a sum of the first width of the first block and the second width of the second block.

19. The generator set of claim 18 comprising a face plate coupled to the outer ring member, the face plate configured to restrict axial movement of the first block and the second block within each of the plurality of slots.

20. The generator set of claim 18, wherein the housing of the generator comprises one or more openings configured to receive the first block and the second block therethrough.

* * * * *